US008213673B2

(12) United States Patent
Cornog (10) Patent No.: US 8,213,673 B2
(45) Date of Patent: Jul. 3, 2012

(54) WATERMARKING OF MOTION PICTURES (75) Inventor: Katherine H. Cornog, Newburyport, MA (US)

(73) Assignee: Avio Technology, Inc., Burlington, MA (US)

( * ) Notice: Subject to any disclaimer, the term of this patent is extended or adjusted under 35 U.S.C. 154(b) by 416 days.

(21) Appl. No.: 12/481,004

(22) Filed: Jun. 9, 2009

(65) Prior Publication Data
US 2010/0310114 A1 Dec. 9, 2010

(51) Int. Cl.
G06K 9/00 (2006.01)
H04L 9/32 (2006.01)
(52) U.S. Cl. .................................. 382/100; 713/176
(58) Field of Classification Search .................. 382/100, 382/232, 240; 380/51, 54, 210, 252, 287; 370/522–529; 283/72, 74–81, 85, 93; 713/176, 713/179; 358/3.28
See application file for complete search history.

(56) References Cited

U.S. PATENT DOCUMENTS

| | | |
|---|---|---|
| 5,170,440 A | 12/1992 | Cox |
| 5,359,362 A | 10/1994 | Lewis et al. |
| 5,363,305 A | 11/1994 | Cox et al. |
| 5,383,013 A | 1/1995 | Cox |
| 5,644,651 A | 7/1997 | Cox et al. |
| 5,696,964 A | 12/1997 | Cox et al. |
| 5,727,080 A | 3/1998 | Cox et al. |
| 5,734,592 A | 3/1998 | Cox et al. |
| 5,751,838 A | 5/1998 | Cox et al. |

(Continued)

FOREIGN PATENT DOCUMENTS
WO WO 99/63443 12/1999

OTHER PUBLICATIONS

Kwok, Sai Ho., "Watermark-Based Copyright Protection System Security", Communications of the ACM, vol. 46, No. 10, Oct. 2003, pp. 98-101.

(Continued)

Primary Examiner — Abolfazl Tabatabai
(74) Attorney, Agent, or Firm — Oliver Strimpel (57) ABSTRACT The problem of watermarking a sequence of images from a motion picture can be divided into two parts. The first part is embedding watermarks in the sequence of images. The second part is detecting embedded watermarks in a target sequence of images where the target sequence may have resulted from one or more attacks on an original sequence of images in which the watermarks were embedded. Motion pictures are watermarked by embedding information in different ways in different images. In general, the information to be embedded is used to define a plurality of watermark images. Each watermark image is an apparent pattern of noise in both signal and frequency domains, and is different from the other watermark images. Preferably, each watermark image is temporally uncorrelated with the other watermark images. Each watermark image is used to modify a corresponding image from the motion picture. To detect the presence of the information in a target sequence of images from a motion picture, the target images are processed to determine an alignment with a watermark sequence. When an alignment with the watermark sequence is determined, a sliding window detector is applied to detect the watermark and read the information embedded by the watermark. By embedding the same information in different ways in different images, and then detecting this information by combining data from the different images, the sensitivity of the detector is increased.

33 Claims, 4 Drawing Sheets

U.S. PATENT DOCUMENTS

| | | |
|---|---|---|
| 5,774,576 A | 6/1998 | Cox et al. |
| 5,848,155 A | 12/1998 | Cox |
| 5,915,027 A | 6/1999 | Cox et al. |
| 5,930,369 A | 7/1999 | Cox et al. |
| 5,991,426 A | 11/1999 | Cox et al. |
| 6,064,738 A | 5/2000 | Fridrich |
| 6,069,914 A | 5/2000 | Cox |
| 6,078,688 A | 6/2000 | Cox et al. |
| 6,108,434 A | 8/2000 | Cox et al. |
| 6,154,571 A | 11/2000 | Cox et al. |
| 6,208,735 B1 * | 3/2001 | Cox et al. .................. 380/54 |
| 6,278,792 B1 | 8/2001 | Cox et al. |
| 6,282,300 B1 | 8/2001 | Bloom et al. |
| 6,332,194 B1 * | 12/2001 | Bloom et al. .............. 713/176 |
| 6,496,591 B1 * | 12/2002 | Rhoads ..................... 382/100 |
| 6,983,057 B1 * | 1/2006 | Ho et al. ................... 382/100 |
| 7,392,394 B2 * | 6/2008 | Levy .......................... 713/176 |
| 7,844,072 B2 * | 11/2010 | Van Leest et al. ......... 382/100 |
| 2002/0080993 A1 | 6/2002 | Rhoads |
| 2003/0026422 A1 | 2/2003 | Gerheim et al. |
| 2003/0221106 A1 | 11/2003 | Delp et al. |
| 2005/0002543 A1 | 1/2005 | Cornog et al. |

OTHER PUBLICATIONS

Matheson, Lesley R., et al., "Robustness and Security of Digital Watermarks", in J. Imai and Y. Zheng, editors, Financial Cryptography, FC'98, vol. 1465 of Lecture Notes in Computer Science, Springer, Feb. 1998, pp. 227-240.

Voyatzis, G., et al., "Chaotic Watermarks for Embedding in the Spatial Digital Image Domain", in Proc. of ICIP '98, Oct. 1998, Chicago, IL, vol. 2, pp. 432-436.

* cited by examiner

WATERMARKING OF MOTION PICTURES

BACKGROUND

Watermarking involves embedding information in data so that the information is hidden in the normal use of that data. Ideally, the information is embedded so that 1) it does not significantly reduce data quality, 2) the information can be recovered and 3) it is robust both to malicious attacks and nonmalicious attacks such as typical processing operations that may be performed on the data. Thus, watermarking involves a trade-off among data quality, robustness and capacity of information carried by the watermark.

There are several challenges in watermarking a motion picture. A motion picture is any sequence of images that, when played back at a designated frame rate, gives the appearance of motion. Such images may originate from a camera and may be recorded on film, or analog video tape, or digital video tape, or in a data file on a computer readable medium, or may originate in a computer, such as with computer-generated animation or special effects.

The embedded information of a watermark appears as noise added to each image. If this noise is the same in each image in a motion picture, then it may become visually perceptible during playback of the motion picture as images change but the noise does not. In particular, the objects in the images may appear to be moving behind the noise. If the watermarks in different images are the same, or in some cases merely temporally correlated, then the watermarks may become visually perceptible.

Because each image in a motion picture may be valuable, especially during production and editing of the motion picture prior to its formal release, each image of the motion picture should be watermarked. However, watermarking each image differently can be computationally intensive and adds both to the complexity and storage requirements of any process for detecting watermarks.

Motion pictures also are susceptible to time-domain image processing and other operations, in addition to signal domain and frequency domain operations on individual images. Such operations may include, but are not limited to, changes in the color space, bit depth, pixel resolution or temporal resolution (e.g., using frame rate conversion, whether by interpolation or by introduction of repeated fields or frames, or by removal of fields or frames), or changes due to rotation, scaling, cropping, morphing, warping and translation. Such operations also may include compression, especially forms of compression that reduce interframe redundancies in addition to intraframe redundancies. As an example, MPEG-2 and similar compression techniques reduce interframe redundancy by determining the differences between two or more images based on motion information. This combination of information from different images due to interframe compression, has the effect of averaging the noise introduced by watermarks. Such operations can be considered attacks (whether malicious or non-malicious) on any watermarks.

SUMMARY

The problem of watermarking a sequence of images from a motion picture can be divided into two parts. The first part is embedding watermarks in the sequence of images. The second part is detecting embedded watermarks in a target sequence of images where the target sequence may have resulted from one or more attacks on an original sequence of images in which the watermarks were embedded.

Motion pictures are watermarked by embedding information in different ways in different images. The information to be embedded is used to define a plurality of watermark images. Each watermark image is an apparent pattern of noise in both signal and frequency domains, and is different from the other watermark images. Preferably, each watermark image is temporally uncorrelated with the other watermark images. Each watermark image is used to modify a corresponding image from the motion picture. In particular, each watermark image defines values used to modify coefficients in the frequency domain representation of its corresponding image from the motion picture. Such a modification can be implemented using either spatial domain or frequency domain mathematical operations.

There are many ways to create a suitable set of watermark images. For example, one or more structured watermarks and one or more keys may be input to a permutation and mix operator to produce the set of watermark images. A structured watermark is any data that has perceptible structure. It may be defined based on the information or message which is intended to be embedded in the motion picture. The structured watermark defines an ordered set of variations, which are permuted to reduce perceptible structure, and then are used to modify an image, thus embedding the watermark in the image. A key may be any value that may be used by the permutation and mix operator to specify parameters of a function that generates a watermark image from the structured watermark. The keys that are input to the permutation and mix operator can be generated using another permutation function, given a seed key.

For each structured watermark used, if a number N of watermark images is desired, then it is permuted and mixed N times using a permutation and mixing function using N keys. An indication of the keys can be stored. The set of keys can be represented by a single seed key that is used to generate the set of keys. The watermark images may be stored in memory or in a data file for later embedding in images. Information describing the structured watermark(s), permutation and mix function, seed key and/or key(s) can be stored to permit the set of watermark images to be generated at another time, or for use in detection. Detection may be performed using the permutation and mix function with the seed key, or may be performed additionally using the structured watermark. Detection can be performed without the knowledge of the original structured watermark.

A watermark sequence is defined using the plurality of watermark images. While the key(s) used by the permutation and mix operation provide a number N of unique watermark images, the watermark sequence is defined using these watermark images which might have a length greater than N. This information defining the watermark sequence also may be stored with the key(s) to permit regeneration of the watermark sequence. The watermark sequence determines the correspondence between each of the watermark images and its corresponding image in the motion picture to be watermarked. If there are more images in the motion picture than watermark images in the watermark sequence, the motion picture can be divided into groups of images and the watermark sequence can be applied to each group of images.

The watermark sequence may be a simple sequence of length N of the watermark images. The sequence may be any other deterministic mapping of the watermark images into a sequence. The watermark sequence may be specified so as to repeat certain watermark images. For example, if the motion picture to be watermarked contains interlaced images, then each field in a frame may be watermarked by the same watermark image. If the motion picture is to be compressed using a form of interframe compression based on a group of pictures (such as MPEG-2), then each picture in the group of pictures (or a significant subset of each group of pictures) may be watermarked by the same watermark image. If the motion picture includes repeated or redundant fields, such as 3-2 pulldown material, then the watermark sequence may repeat watermark images to match the pulldown cadence.

Given the set of watermark images and a specification of the watermark sequence, an embedder receives a selected image from the motion picture (or from a group of images in the motion picture) and embeds the corresponding watermark image according to the watermark sequence to produce as an output the watermarked image. For the embedder, each watermark image represents modifications to be made to the frequency coefficients of its corresponding image, after that image is transformed to a frequency domain representation. Alternatively, in one implementation, an inverse transform of each watermark image may be generated and stored in advance. These transformed watermark images may be applied directly to the corresponding images from the motion picture to embed the watermark. Using such transformed watermark images, the embedder may be able to operate on each image of the motion picture in real time as the motion picture is played back, whether at its full frame rate, a slower frame rate or faster frame rate. For example, the embedder may receive the output of a decoder that is decompressing compressed image data read from a data file. After the decompressed image is generated, it may be input to the embedder. The transform of its corresponding watermark image may be applied directly to the decompressed image, without involving any transform operations to be performed during playback.

To detect a watermark sequence in a target sequence of images from a motion picture, all attempt is made to align, both temporally and spatially, the target sequence of images with the corresponding original sequence of images from the motion picture to which the watermarking was applied. The original sequence of images, if available to the detector, may be subtracted from this aligned target sequence of images.

Each of the images in the target sequence of images is transformed to the frequency domain to obtain its frequency domain representation. Each transformed image is unmixed and unpermuted, by performing the inverse of the permutation and mix operations performed on the structured watermark that is believed to be embedded in that image, using the stored keys. The result is a set of unmixed, unpermuted target images in the frequency domain. If the temporal alignment between the target images and the original sequence of images is not known, there are likely N possible temporal alignments. Each of these possible temporal alignments could be tested, by performing the inverse of the permutation and mix operations on each target image using each of the N stored keys.

Given the set of unmixed, unpermuted target images, there are several ways to detect the watermark, depending on the information available to the detector.

If the original sequence of images is available to the detector, then it may be subtracted from the target sequence of images. In this case, the result of this subtraction will be a set of images that includes the structured watermark and any noise introduced by various attacks. The results of this subtraction can be unmixed and unpermuted and processed by the detector. The images in the unmixed and unpermuted results of the subtraction may be averaged together. If the attacks are not severe it may be possible for an individual to visually detect the watermark in the unmixed and unpermuted results of the subtraction, or its average.

If the structured watermark is available, then a correlation detector may be used. Such a correlation detector compares the unmixed, unpermuted target images with the structured watermark, whether the original sequence of images is available or not.

In cases where the original sequence of images and the structured watermark are not available, or where the alignment is unknown, the detector can use the known structure of the watermark. In this case, a temporal alignment can be determined between the original sequence of images and the target images by identifying the key which provides the best detection results.

DETAILED DESCRIPTION

The problem of watermarking a sequence of images from a motion picture can be divided into two parts. The first part is embedding watermarks in the sequence of images. The second part is detecting embedded watermarks in a target sequence of images where the target sequence may be the result of attacks on all original sequence of images in which the watermarks were embedded.

Figure 1:
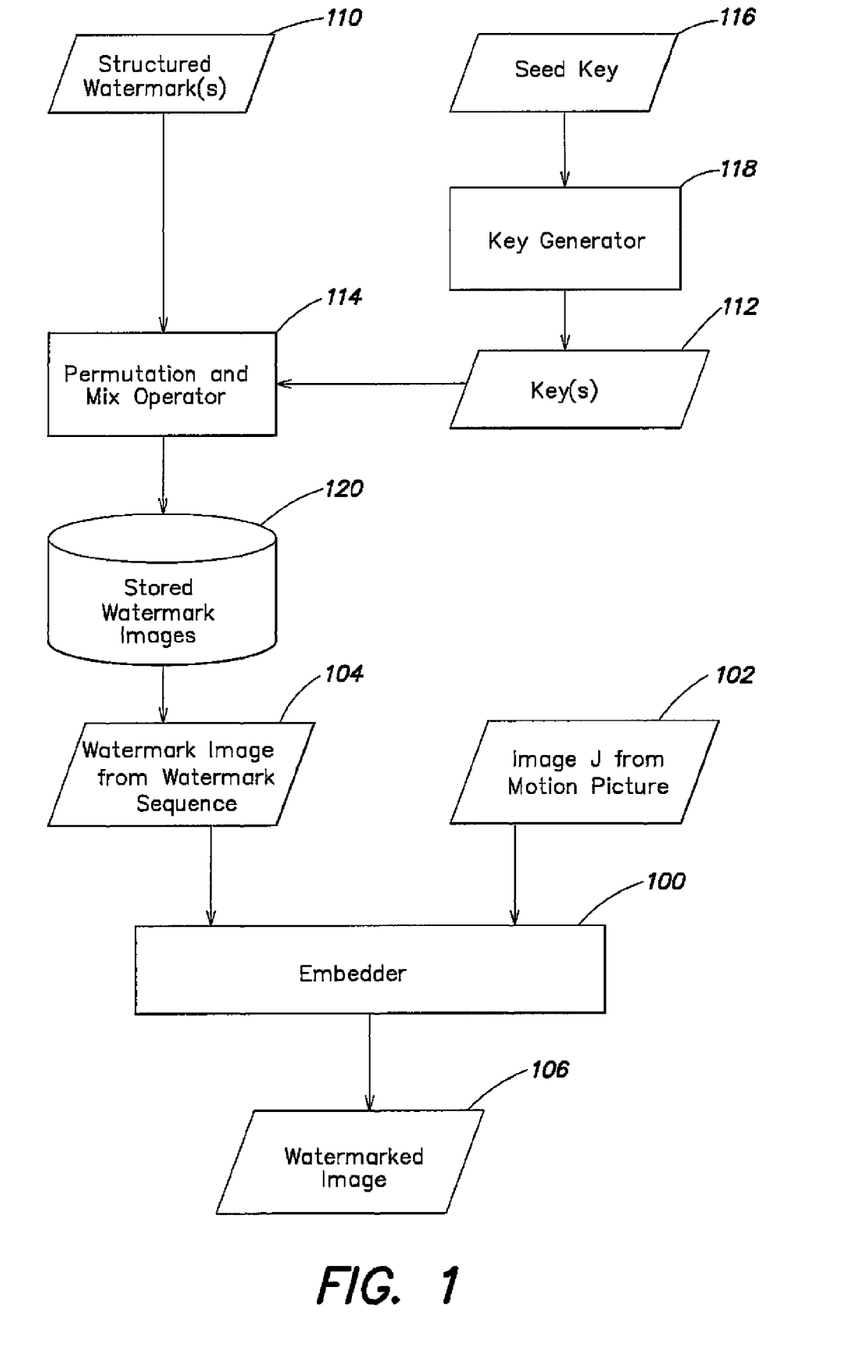
FIG. 1 is a data flow diagram of an example implementation of an encoder for watermarking a sequence of images from a motion picture.
Figure 2:
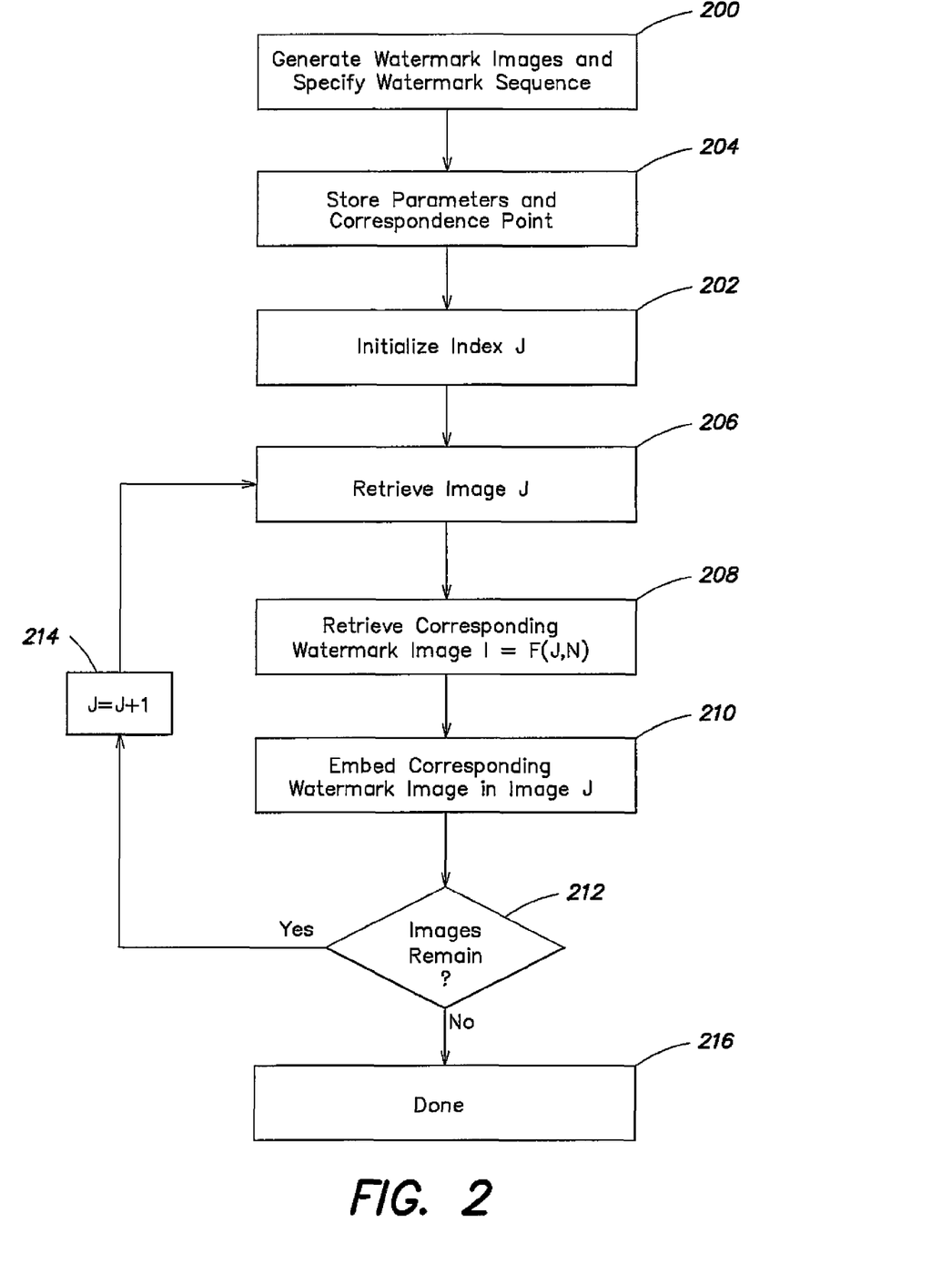
FIG. 2 is a flow chart illustrating example steps of a watermarking process.

Referring now to FIGS. 1 and 2, how watermarks are embedded in a sequence of images from a motion picture will first be described.

Motion pictures are watermarked by embedding information in different ways in different images. In general, the information to be embedded is used to define a plurality of watermark images 120. Each watermark image is an apparent pattern of noise in both signal and frequency domains, and is different from the other watermark images. Preferably, each watermark image is temporally uncorrelated with the other watermark images. Each watermark image is used to modify a corresponding image from the motion picture. In particular, each watermark image defines values used to modify coefficients in the frequency domain representation of its corresponding image from the motion picture.

There are many ways to create a suitable set of watermark images 120. For example, one or more structured watermarks 110 and one or more keys 112 may be input to a permutation and mix operator 114, described below, to produce the set of watermark images. A structured watermark 110 is any data that has perceptible structure. It may be defined based on the information or message which is intended to be embedded in the motion picture. The structured watermark defines an ordered set of variations which are used modify an image, thus embedding the watermark in the image. A key 112 may be any value that may be used by the permutation and mix operator 114 to specify parameters of a function that generates a watermark image from the structured watermark 110.

If a single structured watermark 110 is used, and if a number N of watermark images is desired, then a set of N keys 112 is used. The watermark images may be stored in memory or in a data file as indicated at 120. Information describing the structured watermark(s) 110 and key(s) 112 also may be stored to permit the set of watermark images to be generated at another time.

If a single structured watermark 110 is used to create the plurality of watermark images 120, then the same information would be embedded in the multiple images but in different ways. In particular, the same structured watermark is permuted and/or mixed using different operations, and the different results are embedded in multiple images from the motion picture. By using multiple images to carry the same information in different ways, the embedding strength required for the watermark image to survive an attack, whether malicious or non-malicious, is reduced. Lowering the embedding strength also results in an increase in the peak signal-to-noise ratio (PSNR) of the watermarked image, meaning that the watermark will be less visible. By temporally decorrelating the noise pattern introduced by watermarking by using different keys for each watermarked image, the watermark also is less detectable by the human visual system.

In one implementation, the permutation and mix operator 114 first applies a permutation operation to the structured watermark 110, then applies a mixing operation to the permuted structured watermark to generate each watermark image. The permutation operation, the mixing operation or both may be controlled by the key 112.

The permutation operation may be, for example, a monotonic function specified by a set of parameters. The key 112 may be used to generate parameters of this function using, for example, a one-dimensional chaotic map. With such a chaotic map, a difference of 1 in a single digit between two keys produces a completely different set of parameters from each key. These parameters determine a permutation of frequency domain values representing the watermark image. The set of permutations produced this way are uncorrelated with each other.

Given a permuted watermark image, it is then mixed according to a mixing operation. The mixing operation creates an irregular mapping of positions in the ordered set of variations (defined by the structured watermarks) to positions in an ordered set of frequency domain values that represent an image in which a watermark will be embedded. A variety of suitable irregular mappings are described in U.S. Patent Publication 20050002543, which is hereby incorporated by reference. The mixing operation preferably has characteristics such that if the same structured watermark 110 is permuted according to different keys 112, then the results of the subsequent mixing operations on the permuted structured watermarks should be uncorrelated. The key 112 alternatively may indicate a different number of iterations of the mixing operation to be applied to the structured watermark (whether or not the structured watermark is permuted).

A key generator 118 may be used to generate the set of N keys 112 from a single seed key 116 using any deterministic mapping. For example, the seed key 116 may be a number and the key may be incremented, module N, by the key generator 118. By enabling the generation of a set of keys from a single seed key, the number of keys that are stored for decoding the watermark is reduced.

A watermark sequence is defined using the plurality of watermark images 120. The key(s) 112 or seed key 116 or other information may specify how the watermark sequence is defined. While the key(s) used by the permutation and mix operation provide a number N of unique watermark images, the watermark sequence is defined using these watermark images which might have a length greater than N. This information defining the watermark sequence also may be stored with the key(s) to permit regeneration of the watermark sequence. The watermark sequence determines the correspondence between each of the watermark images 120 and its corresponding image in the motion picture to be watermarked. If there are more images in the motion picture than watermark images in the watermark sequence, the motion picture can be divided into groups of images and the watermark sequence can be applied to each group of images.

The watermark sequence may be a simple sequence of length N of the watermark images. The sequence may be any other deterministic mapping of the watermark images into a sequence. The watermark sequence may be specified so as to repeat certain watermark images. For example, if the motion picture to be watermarked contains interlaced images, then each field in a frame may be watermarked by the same watermark image. If the motion picture is to be compressed using a form of interframe compression based on a group of pictures (such as MPEG-2), then each picture in the group of pictures (or a significant subset of each group of pictures) may be watermarked by the same watermark image. If the motion picture includes repeated or redundant fields, such as 3-2 pulldown material, then the watermark sequence may repeat watermark images to match the pulldown cadence.

It is helpful to specify the watermark sequence as a function that provides an index i into the set of watermark images given an index j into the sequence of moving images to be watermarked. For example, assume that j is the index (such as a frame or field number) into the sequence of moving images and N is the number of watermark images, and the index i is all integer such that 0<i<N, or 0<=i<N. A watermark sequence can be defined by a function that cycles through all the watermark images in a simple sequence by equation (1):

$$i=\mathrm{mod}(j,N). \tag{1}$$

A more general function (F) may be specified, as shown by equation (2):

$$i=F(j,N). \tag{2}$$

The function defining the watermark sequence may have an index (such as the mth index $i_m$) dependent on the previous index ($i_{m-1}$), as shown by equation (3):

$$i_m=F(j,i_{m-1},N). \tag{3}$$

The function defining the watermark sequence may have an index dependent on some other parameter p, which may be stored as part of the key or may be derived from the key, as shown by equation (4):

$$I=F(j,p,N). \tag{4}$$

The function defining the watermark sequence may have all index dependent on a characteristic of the jth image (Image_j), as shown by equation (5):

$$i=F(\mathrm{Image\_}j,N). \tag{5}$$

A function combining any of these possible parameters may be specified, as shown by equation (6):

$$i_m=F(j,i_{m-1},N,p,\mathrm{Image\_}j). \tag{6}$$

provided that the ordering produced by the function F is deterministic and produces the same sequence at the detector as at the embedder.

Given the set of watermark images and a specification of the watermark sequence, an embedder 100 receives a selected image 102 from the motion picture (or from a group of images in the motion picture) and embeds the corresponding watermark image 104 according to the watermark sequence to produce as an output the watermarked image 106. Operation of the embedder 100 on a single pair of watermark image 104 and image 102 from a motion picture is in accordance with the techniques set forth in U.S. Patent Publication 20050002543, which is hereby incorporated by reference. In such an embedder, each watermark image represents modifications to be made to the frequency coefficients of its corresponding image, after that image is transformed to a frequency domain representation. Alternatively, in one implementation, an inverse transform of each watermark image may be generated and stored in advance of such playback of the motion picture. These transformed watermark images may be applied directly to the corresponding images from the motion picture to embed the watermark.

Using transformed watermark images, the embedder 100 may be able to operate on each image of the motion picture in real time as the motion picture is played back, whether at its full frame rate, a slower frame rate or faster frame rate. For example, the embedder may receive the output of a decoder that is decompressing compressed image data read from a data file. After the decompressed image is generated, it may be input to the embedder 100. The transform of its corresponding watermark image may be applied directly to the decompressed image, without involving any transform operations to be performed during playback.

For any watermarked motion picture or portion thereof, information indicative of the parameters of the watermarking operation is stored for later use in detecting the watermarks. For example, such information may include, but is not limited to, any key(s), structured watermark(s), the permutation operation and mixing operation used, and the watermark sequence.

Referring to FIG. 2, a flow chart illustrating example steps of a watermarking process will now be described. The set of watermark images (such as 120 in FIG. 1) are generated (200), and the watermark sequence is specified. Any parameters used to create the watermark images and the watermark sequence may be stored, and any correspondence point between the watermark sequence and the sequence of images from the motion picture to be watermarked also may be stored (204). A variable representing an index j into the sequence of images to be watermarked is initialized (202). The image j from the motion picture and its corresponding watermark image are retrieved (206, 208). The retrieved watermark image is embedded (210) in the retrieved image. If no images are left in the motion picture to be watermarked, as determined at (212), then the process is done (216); otherwise, the index j is incremented (214). The watermarking process continues with retrieving the next image j and its corresponding watermark image (206, 208). The corresponding watermark image is determined using function F.

Because this watermarking can be applied to a sequence of images at its full frame rates during capture and playback, i.e., in real-time, it can be used in a number of different applications. For example, cameras, digital video assists, video recorders, editing systems, projectors for digital cinema, DVDs, other encoders and decoders for distribution of movies and display processors, can all include this kind of watermarking. The watermarking applied to a motion picture may be unique to each device by having either structured watermarks or associated keys be unique for each device. If the watermark images are unique to the device that is playing back the motion picture, later detection of the same watermark in a target sequence of images will identify that device as the source of the target sequence of images.

Motion pictures are distributed for viewing in a variety of ways. The various combination of media on which a motion picture may be transmitted or stored, whether transiently or permanently, and the variety of image processing operations that may be applied to a motion picture in the course of its distribution, may be understood as a communication channel that introduces noise into the motion picture. For example, a motion picture may be stored on a DVD. The motion picture may be recorded on optical film, projected by a film projector on a screen, captured on a camcorder in compressed form, and then converted into a computer file encoded in a media format used for internet distribution. The motion picture might be transmitted in a digital format to a cinema, projected by a digital cinema projector on a screen, captured on a camcorder in compressed form, and then converted into a computer file encoded in a media format used for internet distribution. A single image might be extracted from the motion picture, then enlarged and printed to make a poster.

These various transmission and image processing operations used to distribute (whether authorized or unauthorized) a motion picture may be understood as attacks, whether malicious or nonmalicious, on the watermarks in the motion picture. For example, the motion picture may be subjected to time-domain image processing and other operations, hi addition to signal domain and frequency domain operations on individual images. Such operations include, but are not limited to, changes in the color space, bit depth, pixel resolution or temporal resolution (e.g., using frame rate conversion, whether by interpolation or by introduction of repeated fields or frames, or by removal of fields or frames), or changes due to rotation, scaling, cropping, morphing, warping and translation. Such operations also include compression, especially forms of compression that reduce interframe redundancies in addition to intraframe redundancies. As an example, MPEG-2 and similar compression techniques reduce interframe redundancy by determining the differences between two or more images based on motion information. This combination of information from different images due to interframe compression, has the effect of averaging the noise introduced by watermarks. Even more complicated video processing operations may have been performed on the watermarked images, such as compositing, color correction and other effects.

Because distribution of a motion picture may be authorized or unauthorized, one or more images that are the result of distribution of a motion picture might be tested to detect the presence of one or more structured watermarks. Herein, the set of one or more images that may be tested is called a "target sequence of images." In the target sequence of images, a watermark likely will have been subject to a variety of malicious and/or nonmalicious attacks. The detection process seeks to identify whether a watermark was applied to the original images from which the target sequence of images was derived, notwithstanding the likelihood that such attacks may have occurred in the course of distribution.

Detecting whether a watermark is present in a target sequence of images from a motion picture involves determining the correlation between the images in the target sequence and the structured watermark(s) applied to an original sequence of images from the motion picture. How a detector determines such a correlation may depend on how the structured watermark(s) were applied to the original sequence, including factors such as the number of structured watermarks used, whether the watermark sequence is known, whether the structured watermark(s) is/are known, whether the spatial alignment between target images and original images is known, whether the temporal alignment between the watermark sequence and target sequence is known, and whether the original unmarked source images are available.

Detection ultimately involves determining whether a watermark is present in an image, using the watermark detection techniques set forth in U.S. Patent Publication 20050002543. However, when multiple watermark images are detected in multiple images in a target sequence, the confidence increases that the target sequence originated from the original watermarked sequence. In addition, if the same structured watermark is embedded in multiple different images in different ways, the ability to detect the watermark is increased.

The detection process is designed to accommodate the fact that spatial and temporal transformations have occurred between images in the target sequence and the original motion picture from which the target sequence originated. Example spatial transformations include, but are not limited to, cropping, resizing, morphing, warping and translating. Example temporal transformations include, but are not limited to, retiming effects, introduction of pulldown fields or frames, trimming and other editing operations, sample rate conversions with or without interpolation, format conversions, repeating frames or fields or dropping frames or fields.

To address the spatial transformations, images from the target sequence may be transformed spatially to achieve spatial alignment between each target image and its corresponding original image. This spatial alignment may be achieved by performing, on the target sequence of images, the mathematical inverse of any spatial transformation that might have been performed to create the target sequence of images. If the original sequence is available at the detector, it may be used to assist in determining the spatial alignment of the target sequence. Alignment can be done by eye, or even automatically by identifying and aligning correspondence points.

Similarly, images from the target sequence may be transformed temporally to achieve temporal alignment. There are two types of temporal alignment. First, there is alignment between the target sequence and the original sequence. This alignment permits the original sequence to be subtracted from the target sequence. One may attempt to perform the mathematical inverse of any temporal transformation that might have been performed to create the target sequence of images. If the original sequence is available at the detector, it may be used to assist in determining the temporal alignment with the target sequence. If the resolution, frame rate or other information about appearance of the original sequence (such as pulldown), including merely a single frame, is known, then that information can be used to generate better hypotheses for temporal alignment. If the original unmarked source images from the motion picture are available, they may be subtracted from the temporally and spatially aligned target sequence of images. In effect, the result of this operation is the noise introduced to the original unmarked source images by the watermarks and other attacks on the original images. Eliminating the original signal allows the detector to analyze only the noise, which improves the sensitivity of detection.

Second, there is the temporal alignment between the watermark sequence and the target sequence. This temporal alignment is achieved by finding the start of the watermark sequence in the target sequence. The detection process permits this alignment between the target sequence and the watermark sequence (and the alignment between the original sequence and the watermark sequence) to be unknown. However, the alignment between the target sequence and watermark sequence can be discovered by evaluating a series of hypotheses. Each of these hypotheses can be evaluated by attempting to detect the watermark sequence according to each hypothesis. If any of the hypotheses is correct, then the detector will detect the watermark sequence.

Given a hypothesis of the alignment of the watermark sequence and the target sequence, each of the target images is then processed by performing a transform to obtain its frequency domain representation. This frequency domain representation is permuted and mixed according to the inverse of the permutation and mixing operations performed to create the corresponding watermarking image in the watermark sequence. The result of this operation, if no attacks occurred on the target image and if the original image were subtracted from the target image, and if the alignment with the watermark sequence is correct, would be the structured watermark. If attacks had occurred on the target image (and if the original image were subtracted from the target image), then the result of this operation would be the structured watermark with some amount of noise introduced.

Given these operations, there are several ways to perform detection.

A detection operation can be performed on each of the unpermuted, unmixed frequency domain representations of each image in the target sequence of images. Such detection may be performed using the watermark detection techniques set forth in U.S. Patent Publication 20050002543. However, better detection can be achieved by averaging together several unpermuted, unmixed frequency domain representations of target images. Such averaging has the effect of simultaneously increasing the strength of the signal representing the structured watermark and filtering out the noise that may have been introduced to the target image by attacks.

If the original sequence of images is available to the detector, then it may be subtracted from the target sequence of images, as noted above. In this case, the target images will include the structured watermark and any noise introduced by various attacks. The resulting set of N unpermuted, unmixed frequency domain representations of target images may be averaged together. If the attacks are not severe it may be possible for an individual to visually detect the structured watermark.

If the structured watermark is available, then a correlation detector may be used. Such a correlation detector compares each of the unpermuted, unmixed frequency domain representations of target images with the structured watermark, whether the original sequence of images is available or not. A correlation operation also may be performed between the structured watermark and an average of the unpermuted, unmixed frequency domain representations of the target images.

In cases where the original sequence of images and the structured watermark are not available, and the alignment between the watermark sequence and the target sequence is unknown, the detector can use the known structure of the watermark. In this case, an alignment can be determined between the watermark sequence and the target images by identifying the key which provides the best detection results, as will be described in more detail below in connection with FIGS. 3 and 4.

In this embodiment, the detection process presumes that a single structured watermark was permuted and mixed N different ways, so that it was embedded in N images of the original sequence of images in N different ways. The ordering of these N permutations, in a watermark sequence, also is known. Also, the structured watermark has known structure, and encodes bits of information differentially within this structure. That is, a bit is encoded by representing it using two pants of the structured watermark, where one part represents a "−1" value and another pail represents a "1" value.

Figure 3:
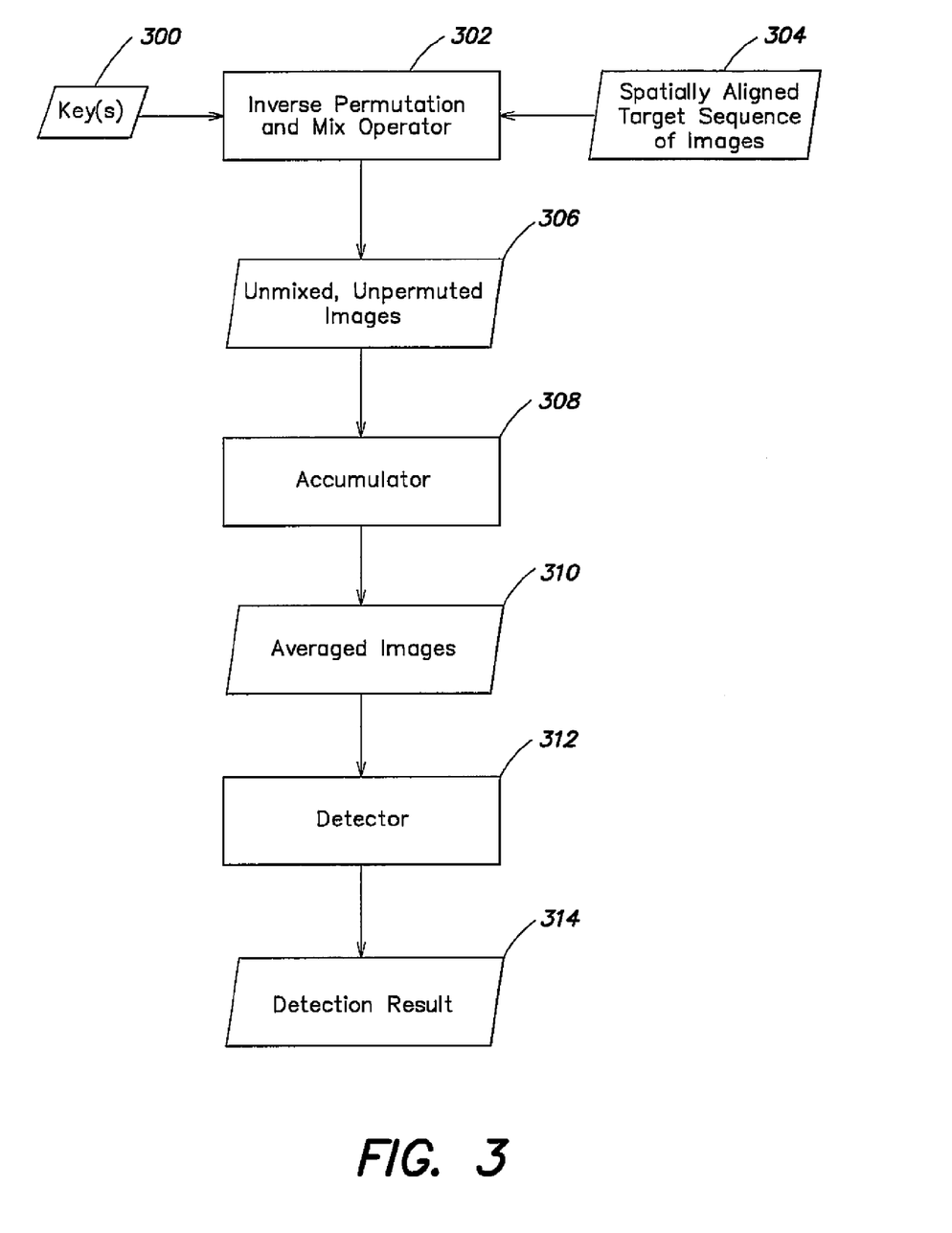
FIG. 3 is a data flow diagram of an example implementation of a detector for detecting watermarks in a target sequence of images.

Referring now to FIG. 3, a data flow diagram of an example implementation of a detector for detecting watermarks in a target sequence of images will now be described. A set of N keys 300 are input to the inverse permutation and mix operator 302. These keys 300 define parameter sets that cause the inverse permutation and mix operator to perform the inverse of the permutation and mix operations that were performed to create the N watermark images of the watermark sequence, and are generated from the information stored by the embedder. Thus, the keys may have been stored or may be generated using a seed key that has been stored. The input to the inverse permutation and mix operator 302 is the spatially aligned target sequence of images 304, optionally with the original sequence of images subtracted out. The operator 302 transforms each image to its frequency domain representation, and then unmixes and unpermutes it. Thus, the output 306 of the inverse permutation and mix operator 302 is each image in the target sequence, unmixed and unpermuted, in its frequency domain representation. Thus, given N keys, and assuming a watermark sequence of length N, N unmixed and unpermuted target images, in their frequency domain representation, are output.

Because the same structured watermark, mixed and permuted in different ways, was embedded in each image, the detector may average, via accumulator 308, each the unmixed, unpermuted target images 306. The number of images that are averaged together can be greater than the number of images in a watermark sequence. This averaging improves the sensitivity of the detector.

Next, the presence of a watermark in the averaged unmixed and unpermuted target images 310 is detected by detector 312. Detection is performed in the manner described in U.S. Patent Publication 20050002543. In particular, given the known structure of the structured watermark, for each bit in a message encoded by the structured watermark there should be first region representing a logical "1" and a second region representing a logical "−1". For each bit, the sum of all values in the first region is subtracted from the sum of all values in the section region, and this difference is compared to a threshold to determine whether the bit has been reliably detected. This information is obtained for each bit in the message encoded by the structured watermark, for the average unmixed, unpermuted target images.

The results of detection in the averaged, unmixed, unpermuted target images can be computed and stored as detection statistics for each possible alignment of the target sequence and the watermark sequence. Thus, for each bit of the structured watermark, for alignment of the target images and the watermark sequence, a result 314 can be computed and stored.

The alignment between the target images and the watermark sequence that provides the best detection result 314 is considered to be the correct alignment and is output by the detector 312.

Given the correct alignment between the target images and the watermark sequence, a sliding window detector of multiple images may be applied to the target sequence to further enhance detection by gathering additional detection statistics. The sliding window detector also may be used to detect the presence of the watermark in long target sequences.

The sliding window detector uses a set of P images, where P is greater than the watermark sequence (typically of length N). It starts with the alignment between the target sequence and the watermark sequence that was previously determined, and starts with a window of P images in the target sequence, starting with image i in the target sequence. The P images are unmixed and unpermuted using the keys associated with their corresponding watermark images, and then averaged together to determine a detection result for each bit of the message represented by the structured watermark. The window is then shifted to process P images starting with image i+1 in the target sequence. These P images are unmixed and unpermuted using the keys associated with their corresponding watermark images, then averaged together to determine a detection result for each bit of the message represented by the structured watermark. This sliding window detector performs this operation a number of times, each time starting at a different point in the target sequence. For each position of the sliding window detector in the target sequence, detection statistics are obtained. These detection statistics then can be used to determine a measure of confidence in detection for each bit of the message encoded by the structured watermark.

Figure 4:
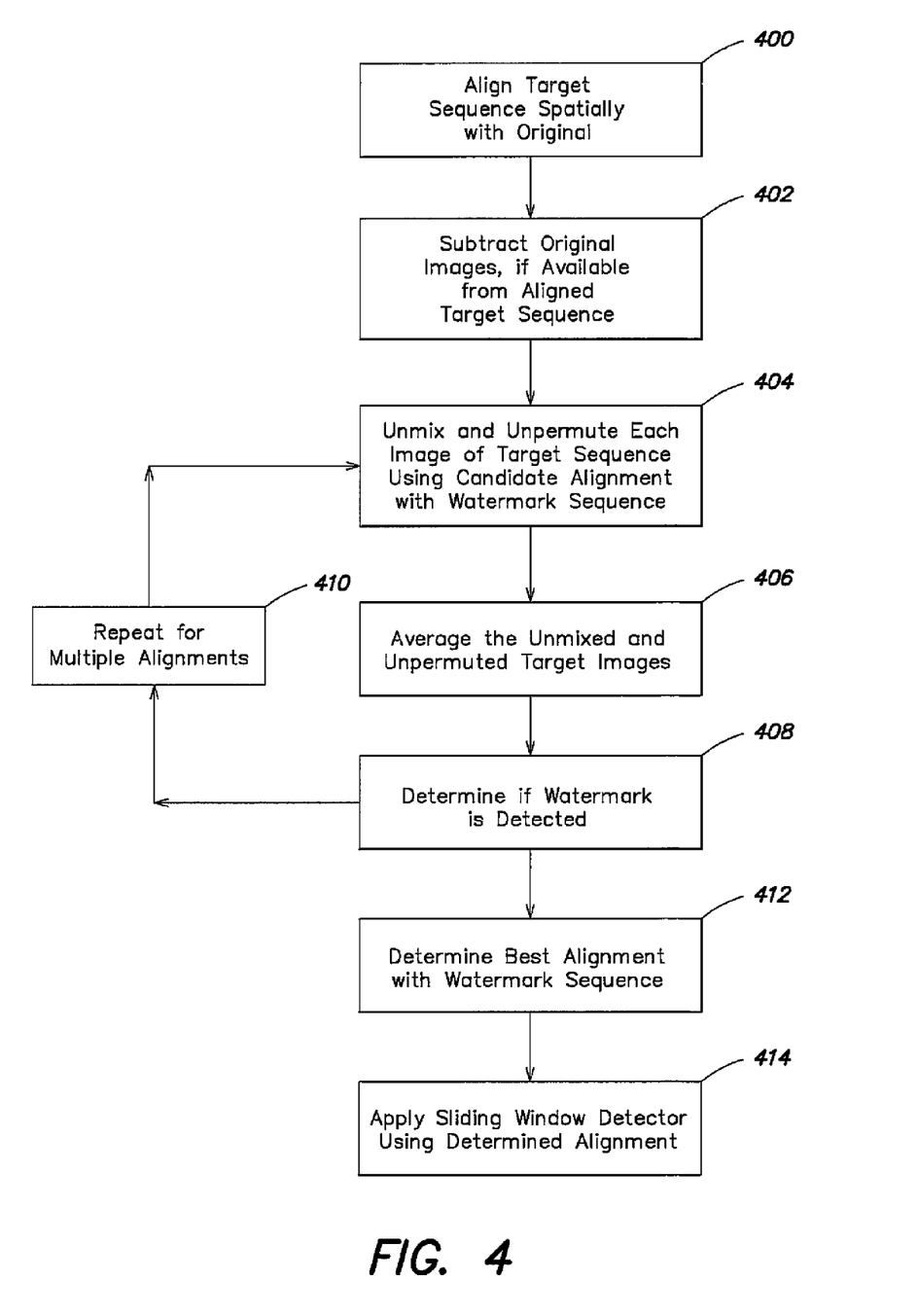
FIG. 4 is a flow chart illustrating example steps of a watermark detection process.

Referring now to FIG. 4, a flow chart illustrating steps of an embodiment of a watermark detection process will flow be described. In particular, the target sequence of images is aligned 400 spatially and temporally with the original sequence. If the original, unmarked images are available, these may be subtracted 402 from the target sequence. Next, each of several images in the target sequence is unmixed and unpermuted 404 according to a hypothesis on the alignment of the target sequence with the watermark sequence. Several images of the target sequence may be averaged 406 together. The detector is then applied 408 to the N target images, and/or the average, to determine detection results. The detection process 408 is repeated for multiple alignment hypotheses (410). Based on the detection results for several alignment hypotheses, the correct temporal alignment is identified (412). Given this temporal alignment, a sliding window detector of several, e.g. "P", images is applied to the target sequence to further enhance detection and to obtain further detection results (414).

The length P of the sliding window detector can be varied. Multiple runs of the detector can be performed with different lengths and different starting positions. For example, in MPEG encoded material, the rate control stabilization that occurs during encoding of the beginning of a motion picture often introduces a stronger attack on a watermark. The starting point of the sliding window detector could be placed a few frames after the beginning to counter this effect. Alternatively, a longer detection window also may be used to counter this effect. Similarly, strong attacks on the watermark also arise in portions of a sequence of images where compositing operations or scene changes occur. Adjusting the starting point or length of the sliding window detector can be used to counter this effect.

In addition to implementations in various video processing products such as cameras, projectors, recorders, playback devices and the like, the various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having flow described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for embedding information into a sequence of images defining at least a portion of a motion picture, the method comprising:
    defining a plurality of watermark images according to the information, wherein each watermark image is different from the other watermark images;
    defining a watermark sequence using the plurality of watermark images; and
    modifying each image in the sequence of images using a corresponding watermark image from the watermark sequence.

2. The method of claim 1, wherein each of the plurality of watermark images is temporally uncorrelated with others of the plurality of watermark images.

3. The method of claim 1, wherein the watermark sequence defines a repetition of a watermark image for a set of consecutive images.

4. The method of claim 1, wherein the watermark sequence defines a repetition of a watermark image for interlaced images.

5. The method of claim 1, wherein each image has a format for a frequency domain representation comprising an ordered set of a plurality of frequency domain values; wherein the information defines an ordered set of variations to be applied to the frequency domain values of a corresponding image, wherein each variation has a value defined by the information; and wherein defining the watermark sequence using watermark images comprises:
    defining a plurality of different irregular mappings from positions in the ordered set of variations to positions in the ordered set of frequency domain values;
    applying the different irregular mappings to the ordered set of variations defined by the information, thereby generating the watermark images; and
    ordering the watermark images into the watermark sequence.

6. The method of claim 5, wherein modifying each image using a corresponding watermark image comprises:
    modifying each frequency domain value for the image by a corresponding variation from the corresponding watermark image as mapped by the irregular mapping to the position of the frequency domain value in the ordered set of frequency domain values.

7. The method of claim 6, wherein the information defines a structured watermark to which the irregular mapping is applied to embed the information in the original motion picture.

8. The method of claim 5, wherein the information defines a structured watermark to which the irregular mapping is applied to embed the information in the original motion picture.

9. The method of claim 1, wherein each image has a format for a frequency domain representation comprising an ordered set of a plurality of frequency domain values; wherein the information defines a plurality of different ordered sets of variations to be applied to the frequency domain values of a corresponding image, wherein each variation has a value defined by the information; and wherein defining the watermark sequence using watermark images comprises:
    defining an irregular mapping from positions in the ordered sets of variations to positions in the ordered set of frequency domain values;
    applying the irregular mapping to each of the different ordered sets of variations defined by the information, thereby producing the watermark images; and
    ordering the watermark images into the watermark sequence.

10. The method of claim 9, wherein modifying each image using a corresponding watermark image comprises:
    modifying each frequency domain value for the image by a corresponding variation from the corresponding watermark image as mapped by the irregular mapping to the position of the frequency domain value in the ordered set of frequency domain values.

11. The method of claim 10, wherein the information defines a structured watermark to which the irregular mapping is applied to embed the information in the original motion picture.

12. The method of claim 9, wherein the information defines a structured watermark to which the irregular mapping is applied to embed the information in the original motion picture.

13. The method of claim 1, wherein defining a plurality of watermark images according to the information, comprises:
    defining a structured watermark corresponding to the information; and permuting and mixing the structured watermark a plurality of times using a plurality of sets of parameters to provide the plurality of watermark images.

14. The method of claim 13, further comprising:
generating the plurality of sets of parameters using a seed key.

15. A computer program product, comprising:
a non-transitory computer-readable medium with computer program instructions encoded thereon, wherein the computer program instructions, when processed by a computer, instruct the computer to perform a method for embedding information into a sequence of images defining at least a portion of a motion picture, the method comprising:
defining a plurality of watermark images according to the information, wherein each watermark image is different from the other watermark images;
defining a watermark sequence using the plurality of watermark images; and
modifying each image in the sequence of images using a corresponding watermark image from the watermark sequence.

16. The computer program product of claim 15, wherein each of the plurality of watermark images is temporally uncorrelated with others of the plurality of watermark images.

17. The computer program product of claim 15, wherein the watermark sequence defines a repetition of a watermark image for a group of pictures.

18. The computer program product of claim 15, wherein the watermark sequence defines a repetition of a watermark image for interlaced images.

19. The computer program product of claim 15, wherein each image has a format for a frequency domain representation comprising an ordered set of a plurality of frequency domain values; wherein the information defines an ordered set of variations to be applied to the frequency domain values of a corresponding image, wherein each variation has a value defined by the information; and wherein defining the watermark sequence using watermark images comprises:
defining a plurality of different irregular mappings from positions in the ordered set of variations to positions in the ordered set of frequency domain values;
defining an order to apply the plurality of different irregular mappings; and
applying the different irregular mappings to the ordered set of variations defined by the information, thereby generating the watermark images.

20. The computer program product of claim 19, wherein modifying each image using a corresponding watermark image comprises:
modifying each frequency domain value for the image by a corresponding variation from the corresponding watermark image as mapped by the irregular mapping to the position of the frequency domain value in the ordered set of frequency domain values.

21. The computer program product of claim 20, wherein the information defines a structured watermark to which the irregular mapping is applied to embed the information in the original motion picture.

22. The computer program product of claim 19, wherein the information defines a structured watermark to which the irregular mapping is applied to embed the information in the original motion picture.

23. The computer program product of claim 15, wherein each image has a format for a frequency domain representation comprising an ordered set of a plurality of frequency domain values; wherein the information defines a plurality of different ordered sets of variations to be applied to the frequency domain values of a corresponding image, wherein each variation has a value defined by the information; and wherein defining the watermark sequence using watermark images comprises:
defining an irregular mappings from positions in the ordered sets of variations to positions in the ordered set of frequency domain values; and
applying the irregular mapping to each of the different ordered sets of variations defined by the information, thereby producing the watermark images.

24. The computer program product of claim 23, wherein modifying each image using a corresponding watermark image comprises:
modifying each frequency domain value for the image by a corresponding variation from the corresponding watermark image as mapped by the irregular mapping to the position of the frequency domain value in the ordered set of frequency domain values.

25. The computer program product of claim 24, wherein the information defines a structured watermark to which the irregular mapping is applied to embed the information in the original motion picture.

26. The computer program product of claim 23, wherein the information defines a structured watermark to which the irregular mapping is applied to embed the information in the original motion picture.

27. The computer program product of claim 15, wherein defining a plurality of watermark images according to the information, comprises:
defining a structured watermark corresponding to the information;
permuting and mixing the structured watermark a plurality of times according to a plurality of parameters to provide the plurality of watermark images; and
ordering the plurality of watermark images into a watermark sequence.

28. The computer program product of claim 27, further comprising:
generating the plurality of parameters using a seed key.

29. In a method for detecting whether information is embedded in a target sequence of images defining at least a portion of a motion picture, wherein the target sequence of images may be derived from an original motion picture in which the information was embedded, the method comprising:
receiving information describing a sequence of watermark images corresponding to the embedded information, wherein each watermark image is different from and temporally uncorrelated with the other watermark images; and
transforming the target sequence of images to a frequency domain representation for each image, wherein the frequency domain representation of each image includes an ordered set of frequency domain values;
selecting an alignment between the target sequence of images and the watermark sequence to provide a corresponding watermark image for each target image;
unpermuting and unmixing the ordered set of frequency domain values for each of the target sequence of images according to an inverse of permutation and mixing operations applied when generating the corresponding watermark image from the sequence of watermark images;
averaging a number of the unpermuted and unmixed target images; and detecting presence of a watermark in the averaged, unpermuted and unmixed target images.

30. The method of claim 29, further comprising:
repeating the selecting, unpermuting and unmixing, averaging and detecting for a plurality of alignments between the target sequence and the watermark sequence.

31. The method of claim 30, further comprising:
selecting an alignment between the target sequence and the watermark sequence according to detection results among the plurality of alignments.

32. The method of claim 31, further comprising:
applying a sliding window detector to the target sequence using the selected alignment.

33. A computer program product, comprising:
a non-transitory computer readable medium having computer program instructions stored thereon, wherein the computer program instructions, when processed by a computer, instruct the computer to perform a method for detecting whether information is embedded in a target sequence of images defining at least a portion of a motion picture, wherein the target sequence of images may be derived from an original motion picture in which the information was embedded, the method comprising:

receiving information describing a sequence of watermark images corresponding to the embedded information, wherein each watermark image is different from and temporally uncorrelated with the other watermark images; and transforming the target sequence of images to a frequency domain representation for each image, wherein the frequency domain representation of each image includes an ordered set of frequency domain values;

selecting an alignment between the target sequence of images and the watermark sequence to provide a corresponding watermark image for each target image;

unpermuting and unmixing the ordered set of frequency domain values for each of the target sequence of images according to an inverse of permutation and mixing operations applied when generating the corresponding watermark image from the sequence of watermark images; and averaging a number of the unpermuted and unmixed target images;

detecting presence of a watermark the averaged, unpermuted and unmixed target images.

\* \* \* \* \*

UNITED STATES PATENT AND TRADEMARK OFFICE
CERTIFICATE OF CORRECTION

| | | |
|---|---|---|
| PATENT NO. | : 8,213,673 B2 | Page 1 of 1 |
| APPLICATION NO. | : 12/481004 | |
| DATED | : July 3, 2012 | |
| INVENTOR(S) | : Katherine H. Cornog | |

It is certified that error appears in the above-identified patent and that said Letters Patent is hereby corrected as shown below:

Title page,
Assignee: Item (73), replace "Avio Technology, Inc." with --Avid Technology, Inc.--.

Signed and Sealed this
Sixth Day of November, 2012

David J. Kappos
*Director of the United States Patent and Trademark Office*